(12) United States Patent
Coulson et al.

(10) Patent No.: US 8,415,832 B2
(45) Date of Patent: Apr. 9, 2013

(54) CABLE COMPENSATION

(75) Inventors: David Robert Coulson, Cambridge (GB); David Michael Garner, London (GB); Johan Piper, Cambridge (GB)

(73) Assignee: Cambridge Semiconductor Limited (GB)

( * ) Notice: Subject to any disclaimer, the term of this patent is extended or adjusted under 35 U.S.C. 154(b) by 215 days.

(21) Appl. No.: 12/354,944

(22) Filed: Jan. 16, 2009

(65) Prior Publication Data

US 2010/0181840 A1 Jul. 22, 2010

(51) Int. Cl.
*H02J 1/00* (2006.01)
*H02J 3/12* (2006.01)

(52) U.S. Cl. ........ 307/103; 324/130; 324/601; 320/133; 307/11; 307/18; 307/31; 307/38

(58) Field of Classification Search .................... 307/103
See application file for complete search history.

(56) References Cited

U.S. PATENT DOCUMENTS

| | | | |
|---|---|---|---|
| 4,213,348 A * | 7/1980 | Reinertson et al. ............. 73/765 |
| 4,922,189 A * | 5/1990 | Dunn et al. .................... 324/142 |
| 5,138,543 A | 8/1992 | Harm et al. |
| 5,438,499 A | 8/1995 | Bonte et al. |
| 6,370,039 B1 | 4/2002 | Telefus |
| 6,795,321 B2 | 9/2004 | Balakrishnan et al. |
| 6,836,415 B1 | 12/2004 | Yang et al. |
| 7,307,390 B2 | 12/2007 | Huynh et al. |
| 7,359,222 B2 | 4/2008 | Mayell et al. |
| 7,400,126 B2 | 7/2008 | Iwashita |
| 7,636,011 B2 | 12/2009 | Frederick et al. |
| 2005/0127756 A1 * | 6/2005 | Shepard et al. ................. 307/18 |
| 2005/0248391 A1 * | 11/2005 | Itoh ............................. 327/540 |
| 2007/0216468 A1 * | 9/2007 | Duarte ......................... 327/513 |
| 2008/0001480 A1 * | 1/2008 | Ooi et al. ....................... 307/85 |
| 2008/0231243 A1 * | 9/2008 | Zhong et al. ................. 323/273 |

FOREIGN PATENT DOCUMENTS

JP 3-40761 2/1991

OTHER PUBLICATIONS

JP Pg-pub 2005-165924 to Warabi—english translation, Jun. 23, 2005.*
US 7,301,390, 11/2007, Frederick et al. (withdrawn)

* cited by examiner

*Primary Examiner* — Hal Kaplan
(74) *Attorney, Agent, or Firm* — Schwegman Lundberg & Woessner, P.A.

(57) ABSTRACT

This invention generally relates to cable compensation, and is particularly applicable to cable compensation for an AC-DC voltage converter. In one embodiment, a cable compensation apparatus for compensating voltage drop of a cable connected between an electrical power supply and an electrical device comprises: a first capacitor; a timer circuit to time a predetermined time period; a current source to supply to said first capacitor during substantially said predetermined time period a first current substantially proportional to an output current outputted by the power supply to the cable; and a control circuit to adjust an output voltage outputted by said power supply to said cable dependent on a voltage on said first capacitor. The compensation in some embodiments is programmable by means of a discrete capacitor component.

20 Claims, 9 Drawing Sheets

2(a)

2(b)

CABLE COMPENSATION

FIELD OF THE INVENTION

This invention generally relates to cable compensation, and is particularly applicable to cable compensation for an AC-DC voltage converter. Specifically, the invention relates to cable compensation apparatuses for compensating voltage drop of a cable connected between an electrical power supply and an electrical device, and to methods of compensating voltage drop of a cable connected between an electrical power supply and an electrical device, the compensation in some embodiments being programmable.

BACKGROUND TO THE INVENTION

Many electrical and electronic devices employ offline power supplies that convert, for example, mains AC to lower voltage DC, and deliver this converted power to the device via a cable. Typically, such devices are either too small or of too low cost to incorporate the power converter into the devices themselves, for example mobile devices such as cellular phones, other rechargeable devices, etc. Therefore, a cable may be used to deliver the DC power to the electrical device.

Most electrical devices have particular requirements for the way in which the supplied voltage and current vary according to the load state of the device. These power supply requirements may be reflected in an output characteristic referred to as an 'IV Curve'.

The field of electrical power supply continues to provide a need for improvements in power supply in relation to desired IV curves.

SUMMARY

According to a first aspect of the invention, there is provided a Cable compensation apparatus for compensating voltage drop of a cable connected between an electrical power supply and an electrical device, comprising: a first capacitor; a timer circuit to time a predetermined time period; a current source to supply to said first capacitor during substantially said predetermined time period a first current substantially proportional to an output current outputted by the power supply to the cable; and a control circuit to adjust an output voltage outputted by said power supply to said cable dependent on a voltage on said first capacitor.

Such an apparatus may comprise a chip, the timer circuit comprising a first resistor and a second capacitor, arranged such that said predetermined time period is substantially proportional to the product of the resistance of said first resistor and the capacitance of said second capacitor, and the current source comprising a second resistor and is arranged to generate said first current by applying to said second resistor a voltage substantially proportional to said output current, wherein said first resistor and said second resistor are integral to said chip.

Such an apparatus may further allow programmable cable compensation if the first capacitor is a discrete component.

Furthermore, the current source may comprise a sensor arranged to sense said output current by sensing a signal on either the primary side or the secondary side of a power supply that comprises a transformer with a primary side and a secondary side.

According to a second aspect of the invention, there is provided a cable compensation apparatus for compensating voltage drop of a cable connected between an electrical power supply and an electrical device, comprising: a first capacitor; a second capacitor; a reference current generator to charge said second capacitor; a timer circuit to determine a first time period dependent on a voltage on said second capacitor; a current source to supply to said first capacitor during substantially said first time period a first current substantially proportional to an output current outputted by the power supply to the cable; and a control circuit to adjust an output voltage outputted by said power supply to said cable dependent on a voltage on said first capacitor.

If it is required to be able to externally program the cable compensation, the above second capacitor is preferably a discrete component.

The above cable compensation apparatus may be particularly applicable where the power supply employs a transformer with a primary side and a secondary side, e.g., a Flyback Converter. In such a case, the current source may comprise a sensor for sensing the output current by sensing a signal on either the primary side or the secondary side.

Where an external capacitor is used for programming an embodiment, which may be of either of the first and second aspects above, the cable compensation apparatus may further comprise a chip comprising said control circuit; a device comprising said chip; said first capacitor connected to an external terminal of said device; and a discrete resistor external to said device and connected to said terminal; and stimulator circuitry to apply to said terminal a predetermined time-varying electrical signal having a first signal part and a second signal part, said first and second signal parts separate in time, to obtain a first signal response of said terminal to said first signal part and a second signal response of said terminal to said second signal part; and said device arranged to program at least two device functions on the basis of said first signal response and said second signal response, wherein at least one of said device functions is cable compensation.

According to a third aspect of the invention, there is provided a method of compensating voltage drop of a cable connected between an electrical power supply and an electrical device, comprising: generating a first current substantially proportional to an output current outputted by said power supply to said cable; charging a first capacitor using the first current during a predetermined time period; adjusting an output voltage outputted by said power supply to said cable dependent on a voltage on said first capacitor.

If it is required to be able to externally program the cable compensation, the method may further comprise determining said first capacitor dependent on a predetermined desired sensitivity of the output voltage adjustment to changes in the output current, wherein said first capacitor is a discrete component.

Furthermore, the method may comprise determining said predetermined time period to be substantially proportional to the product of the resistance of a first resistor and the capacitance of a second capacitor, wherein: said generating is performed by applying to a second resistor a voltage that is substantially proportional to said output current; and said first resistor and said second resistor are integral to a single chip.

According to a fourth aspect of the invention, there is provided a method of compensating voltage drop of a cable connected between an electrical power supply and an electrical device, comprising: generating a predetermined reference current; charging a first capacitor using said predetermined reference current; determining a first time period on the basis of a voltage on said first capacitor; generating a first current that is substantially proportional to an output current outputted by said power supply to said cable; charging a second capacitor using said first current during a second time period dependent on said determined first time period; adjusting an output voltage outputted by said power supply to said cable dependent on a voltage on said second capacitor.

Similarly as described above in relation to the first to third aspects, this method may further comprise determining said first capacitor dependent on a predetermined desired sensitivity of the output voltage adjustment to changes in the output current, wherein said first capacitor is a discrete component. In this way, the cable compensation may be externally programmable.

In either of the methods of the third and fourth aspects, a circuit comprising a discrete resistor and a discrete capacitor may be stimulated with a time-varying electrical signal, the discrete resistor and discrete capacitor being connected to an external terminal of a device, so that a forced response and an unforced response is obtained on the terminal and at least two chip functions may be programmed on the basis of the responses, one of the chip functions being cable compensation and, optionally, another of said functions may be, e.g., determining a time delay, setting an oscillator frequency, or reference current generation. The discrete capacitor and discrete resistor may be arranged relative to one another in various circuit configurations, such as direct serial or parallel connections of these two components.

Thus, the invention is defined by the appended independent claims and preferred embodiments are defined in the appended dependent claims.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF PREFERRED EMBODIMENTS

Figure 2:
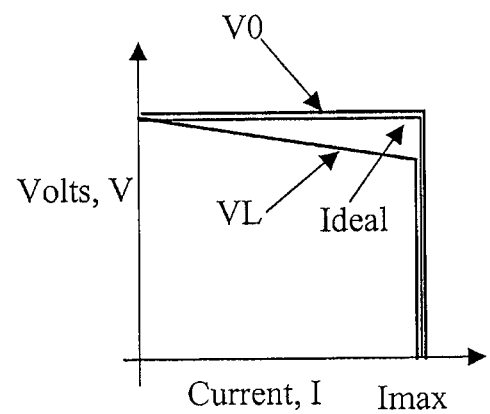
FIG. 2 shows IV Curves for $V_o$ and $V_L$ in the uncompensated (2(a)) and compensated (2(b)) cases.
Figure 2:
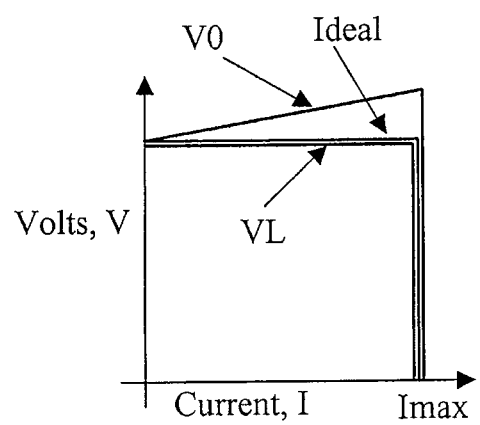

FIGS. 2(a) and 2(b) show an exemplary and simplified ideal IV curve (middle line) having a constant output voltage V for all load currents I up to a maximum current $I_{max}$, at which point V goes to zero (overload). The exemplary and simplified output characteristic measured at the output terminals of the converter, $V_o$, is represented by the thick, outer line, and the corresponding output characteristic measured at the input terminals of the device (i.e., at the far end of the cable), $V_L$, is represented by the thick, inner line.

In the uncompensated supply of FIG. 2(a), the converter output is characterised by the above ideal IV curve.

Figure 1:
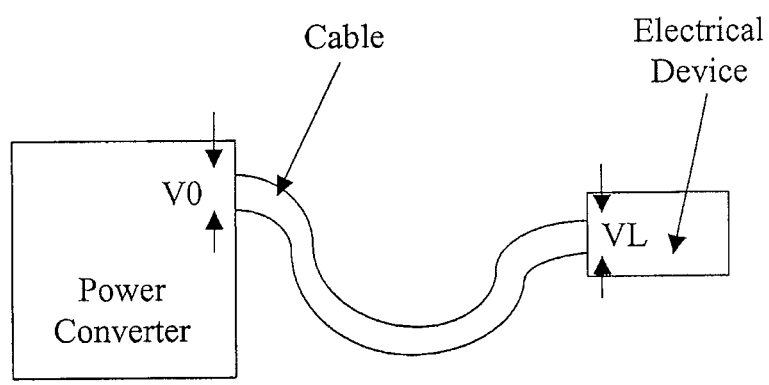
FIG. 1 is a schematic diagram showing a mains-connected power converter connected to an electrical device via a cable.

However, the use of a cable to deliver DC power to an electrical device may result in a current-dependent voltage drop across the length of the cable due to Ohm's law (V=IR), as shown in FIG. 1. This may be because the cable has finite cable conductivity.

In FIG. 1, $V_o$ and $V_L$ are potential differences between the two output terminals of the power converter and between the two input terminals of the electrical device, respectively. It is economical to use as little conductor as possible in the cable, thereby increasing its resistance and the voltage drop across it $(V_o-V_L)$ for a given current.

Thus, cable losses may mean that the IV curve seen by the device input, $V_L$, is characterised by a lower than ideal voltage, for all currents. Further, the discrepancy between ideal and actual voltage $(V_o-V_L)$ may increase as the current increases.

By correcting the output voltage $V_o$ of the converter, the resistance of the cable may be compensated, as shown in FIG. 2(b). As output current increases, the converter may provide an increasing output voltage $V_o$ that translates to an ideal voltage at the far end of the cable $V_L$.

Thus, one advantage of an embodiment may be that voltage supplied to an electrical device complies with the device's particular requirements for the way in which the supplied voltage and current vary according to the load state of the device (standby, high load, etc).

Compensation for resistive and non-resistive losses in cables, primarily in the context of AC or DC power distribution, is desirable. In particular, it is desirable to perform compensation for output cable losses in addition to performing any appropriate corrections to allow for SMPS output circuit (winding, diode, capacitor) losses.

A 'surrogate resistor' method may use representations of the output current and cable resistance to derive an output voltage correction. A reference resistor may be employed to 'simulate' the resistance of the cable. The voltage drop across it may then be used by a power converter's control system to adjust the converter's output voltage $V_o$ so that the voltage at the far end of the cable has the ideal characteristic. However, on-chip resistors typically suffer from greater process variation than other components, such as on-chip capacitors.

Two alternative schemes of advantageously allowing a power converter to compensate for the effects of a resistive output cable are described below. Generally, a capacitor-based compensation approach to cable compensation is used in the described schemes. A particular advantage of both schemes may be that it is unnecessary to employ additional external resistive components.

Cable Compensation Scheme 1

In an embodiment of a cable compensation apparatus, a device comprising a power supply controller chip (or power converter controller chip) may employ a circuit to generate an internal signal which is substantially proportional to the power converter output current. The internal signal may be or comprise a voltage, a current, or a charge; in the discussion below it will be assumed that the signal takes the form of a current but it is to be understood that if the signal takes the form of a voltage or a charge, it is straightforward to use that signal to generate a proportional current which we shall call $I_{ocm}$.

Note that, for a power supply employing a transformer with a primary side and a secondary side, e.g., a Flyback Converter, a measured value of the output current sensed directly from the secondary side could be used, however the advantage of primary side sensing may then be lost.

Suppose that there is an internal reference capacitor on the chip, $C_{int}$, that is charged by this current $I_{ocm}$ for a duration $\Delta t_{ref}$. Then from the capacitor charging equation $I \cdot \Delta t = C \cdot \Delta V$:

$$\Delta V_{cable\ comp} = I_{ocm} \cdot \Delta t_{ref} / C_{int} \quad (1)$$

This provides a variable $\Delta V_{cable\ comp}$ that is substantially proportional to $I_{ocm}$ and can therefore be used to adjust the converter output voltage as the output current approximation varies. Assuming that the current approximation $I_{ocm}$ is a true reflection of the real output current, it may therefore be possible to correct for voltage droop due to cable losses.

The constant of proportionality in equation (1) depends on a fixed internal capacitance $C_{int}$ and a variable time $\Delta t_{ref}$. Adjustment of the sensitivity of the output voltage correction $\Delta V_{cable\ comp}$ to changes in $I_{ocm}$ may therefore be effected by adjusting the charge time $\Delta t_{ref}$. However, this charge time may not be of a convenient duration from the point of view of operating the power supply effectively. Furthermore, $\Delta t_{ref}$ may be generated by a timer such as the chip's internal clock, which may have relatively large variations due to process variations. This may not permit sufficiently accurate calculations of $\Delta V_{cable\ comp}$ by equation (1) for acceptable cable compensation.

With regard to remedying these disadvantages, suppose that a reference current $I_{ref}$ is also generated in the controller chip, and is passed through an external reference capacitor $C_{ext}$. (An external component such as an external capacitor may be a discrete component). If the duration of current flow is equal to the internal capacitor charging time $\Delta t_{ref}$ it will cause the voltage across the external reference capacitor to change by $\Delta V_{ref}$:

$$\Delta t_{ref} = C_{ext} \cdot \Delta V_{ref} / I_{ref} \quad (2)$$

Figure 3A:
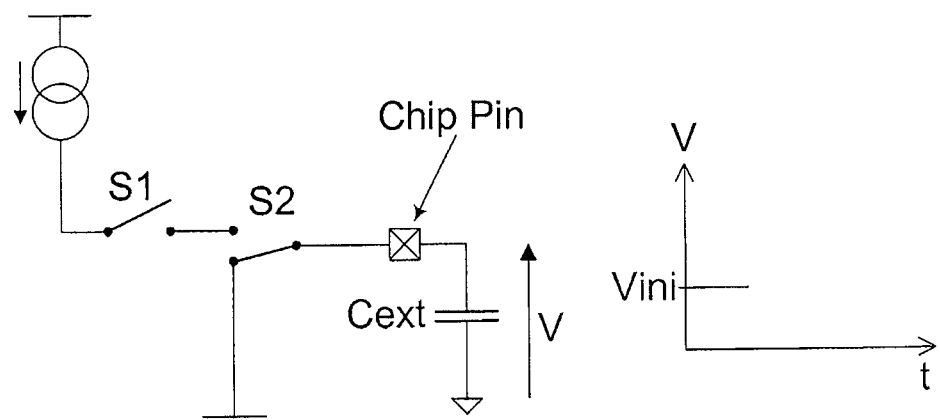
FIGS. 3(a) to (c) illustrate the determination of a voltage change at the connection of a capacitor to a chip pin to program the degree of cable compensation using (a) initialise, (b) charge and (c) hold operations.
Figure 3B:
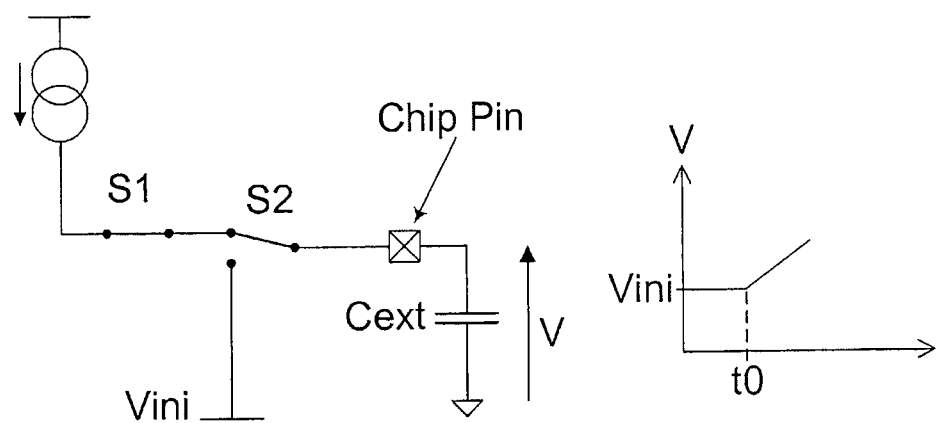
Figure 3C:
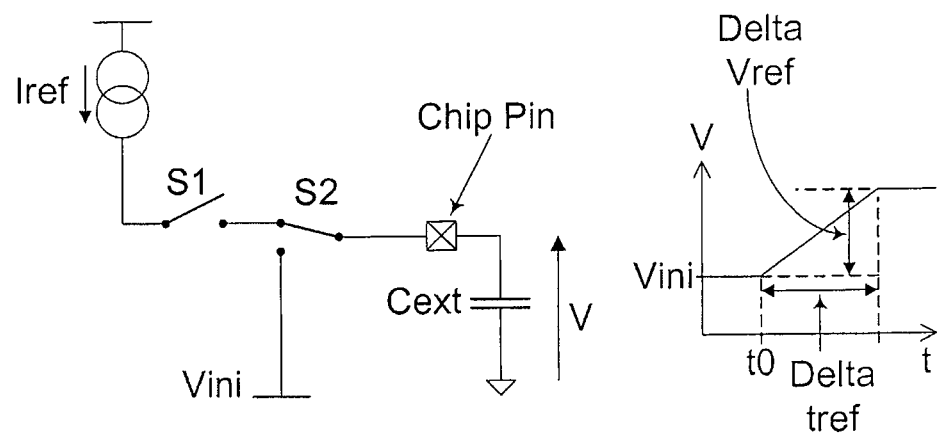

FIGS. 3(a)-(c) illustrate one method of measuring voltage change $\Delta V_{ref}$ across external capacitor Cext due to flow of reference current Iref for time $\Delta t_{ref}$. The chip pin voltage V is first set to a known value Vini (FIG. 3(a)) by connection via switch S2. At time instant t0 (FIG. 3(b)) switches S2 and S1 connect the chip pin to current source Iref, charging capacitor Cext such that chip pin voltage V increases linearly with time. At a time $\Delta t_{ref}$ after time t0 (FIG. 3(c)) switch S1 disconnects the chip pin from current source Iref, and measurement of the chip pin voltage V provides voltage change $\Delta V_{ref}$, since Vini is known.

Substituting for $\Delta t_{ref}$ into equation (1) we find that:

$$\Delta V_{cable\ comp} = I_{ocm} \cdot (C_{ext}/C_{int}) \cdot (\Delta V_{ref}/I_{ref}) \quad (3)$$

Hence the sensitivity of the output voltage correction $\Delta V_{cable\ comp}$ to changes in $I_{ocm}$ can be adjusted by means of the external capacitor $C_{ext}$ and is not affected by variations in clock frequency.

The cable compensation programming capacitor (external capacitor $C_{ext}$) may be connected to a dedicated terminal of a power supply controller device, if such a terminal is available. Such a terminal may be, for example, a pin of a power supply controller chip's packaging. Packaging may be, for example, a plastic dual in-line package (PDIP), small outline package (SOP), small outline transistor package (SOT), pin grid array (PGA), ball grid array (BGA,) thin quad flat pack (TQFP), etc. Many other examples of chip packages having terminals will be known to the skilled person. The terminal, e.g., pin, may be connected to a bonding pad on the chip.

Cable Compensation Scheme 2

It is possible to simplify Scheme 1 to only require a single, pre-existing reference current, $I_{ocm}$—the approximation to, or the measured value of, the power converter output current. By passing this current through an external capacitor $C_{ext}$ for a duration $\Delta t_{ref}$, for example in an analogous method to that illustrated in FIG. 3 for Cable Compensation Scheme 1, then in analogy with equation (1) we have:

$$\Delta V_{cable\ comp} = I_{ocm} \cdot \Delta t_{ref} / C_{ext} \quad (4)$$

This could potentially be used as the output voltage correction, with sensitivity to changes in $I_{ocm}$ provided by the external capacitor $C_{ext}$. However, it may still suffer from variations in the frequency of the clock used to generate $\Delta t_{ref}$.

To remedy this problem, we note that both $\Delta t_{ref}$ and $I_{ocm}$ are dependent upon on-chip, or internal, resistors, as follows:

$$\Delta t_{ref} = R_{clock} \cdot C_{int} \quad (5)$$

$$I_{ocm} = V_{ocm} / R_{int} \quad (6)$$

where $R_{clock}$ and $C_{int}$ represent the properties of the internal RC clock resistance and capacitance, respectively; $V_{ocm}$ is a voltage representation of the output current; and $R_{int}$ is an on-chip resistance used to generate $V_{ocm}$.

Substituting into equation (4) for $\Delta t_{ref}$ and $I_{ocm}$ we find that:

$$\Delta V_{cable\ comp} = V_{ocm} \cdot (C_{int}/C_{ext}) \cdot (R_{clock}/R_{int}) \quad (7)$$

By using the same manufacturing process for resistors $R_{clock}$ and $R_{int}$ we have an effective output voltage correction, the sensitivity of which is programmable via external capacitor $C_{ext}$, and that is advantageously robust to process variations.

The cable compensation programming capacitor (external capacitor $C_{ext}$) may be connected to a dedicated terminal of a power supply controller device as described above in relation to the connection of the cable compensation programming capacitor of scheme 1.

In view of the above schemes 1 and 2, embodiments may use a capacitor-based compensation approach to cable compensation. For example, embodiments of both of the above schemes may make use of two capacitors. In such an embodiment, one capacitor may be internal while the other is external to a power supply controller chip. Further still, such an embodiment may use a representation, or measured value, of the output current and a capacitance external to the power supply controller chip to provide adjustable compensation for voltage drop across the power supply cable due to, e.g., resistive losses, advantageously with insensitivity to process variations. A particular embodiment additionally requires a reference current and an internal capacitance. A further embodiment additionally requires an internal resistance to transform the representation of the output current into a voltage.

In particular, an embodiment may provide simple means of compensating for resistive cable losses between a power converter and its load. Advantageously, minimal extra components may be required. Further advantageously, the degree of compensation may be programmable by suitable choice of an external capacitor. Such compensation may be robust to process variations. Further still, such an embodiment may be applicable to both directly and indirectly sensed output current methods.

Further advantages of some embodiments may be among the following:
  minimal additional components required—makes use of pre-existing variables;

no use of a surrogate impedance of similar type (i.e., a resistance to compensate for resistive losses);

allows use of an RC oscillator on a Cable Compensation pin to simultaneously define a time delay and the amount of cable compensation (see below).

compatibility with primary side sensing schemes.

Use of a Single Terminal to Program Both Cable Compensation and Another On-Chip Function ("Dual Programmability")

The above descriptions of the Cable Compensation Schemes 1 and 2 suggested that a dedicated terminal may be available to which the cable compensation programming capacitor may be connected. However, it may be possible to implement two independent programming functions on a single terminal (e.g., pin) by connecting both a resistor and capacitor to that terminal—hence a single pin may be used to program both the amount of cable compensation and one other programmable chip function, for example a time delay, an oscillator frequency or a reference current.

In the discussion below, reference to a 'pin' is made merely by way of example. The discussion is equally applicable to other types of terminals, e.g., solder balls.

Figure 4:
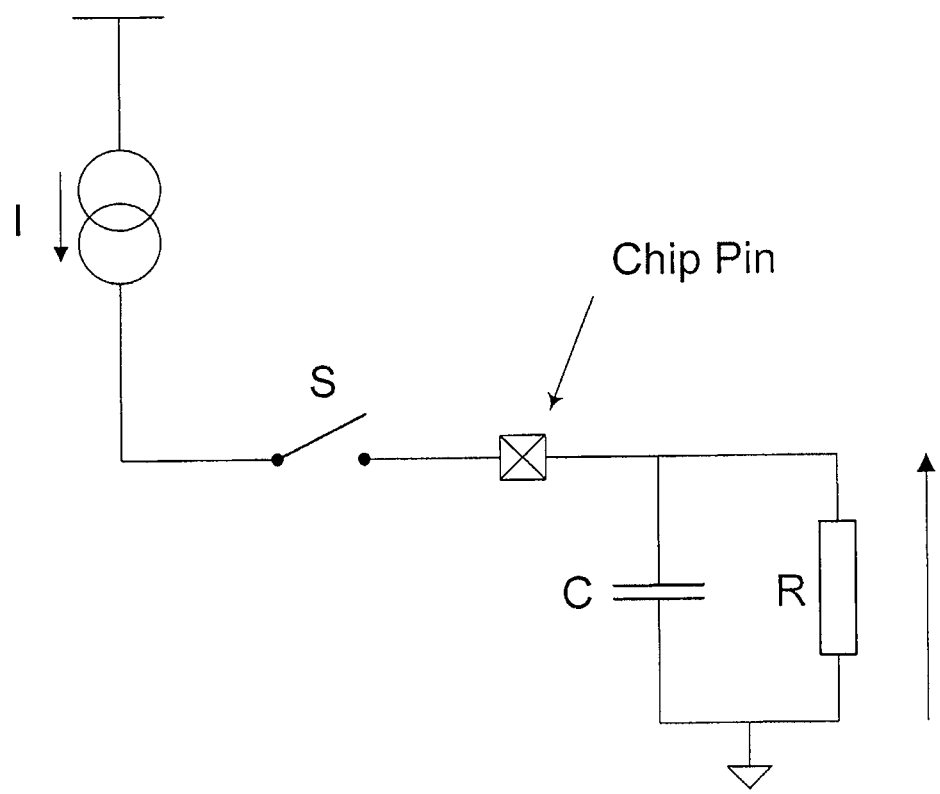
FIG. 4 shows connection of both a resistor and a capacitor to a single chip pin to program both the degree of cable compensation and one other programmable chip parameter.

FIG. 4 shows how a resistor and a capacitor might be connected to a single chip pin to obtain the dual programmability; note however that it is possible to obtain the dual programmability by connecting the two components in series, or by connecting one or both components to a voltage other than ground. Note that the dual programmability is difficult to obtain without stimulating the chip pin: this can be seen by considering the response of V in the s-domain when switch S is open:

$$V(s) = \frac{RCV_0}{1+sRC}$$

Where $V_0$ is the value of V at time zero. Because both R and C appear together as the product RC in this expression, it is difficult to separate the two by analysing the unforced response on the pin and hence it is difficult to implement dual programmability by independently varying R and C.

Now consider the response of the RC network when it is stimulated by a source within the chip. That source could be any time-varying voltage or current source: respectively, the time response of the current flowing out of the pin or the voltage developed across the pin enables us to independently calculate the value of R and the value of C and hence implement dual programmability. Here we consider a current source with a step function increasing from zero for t<0 (by opening switch S) to a DC value of I for t≧0 (by closing switch S). The response of V in the time domain is given by:

$$V(t) = IR(1 - e^{-\frac{t}{RC}})$$

In the above expression, R and RC occur independently and hence it is possible to independently calculate them by observing the transient response of V. For example dV/dt=I/C may give us the value of C, which may be used to implement the programmable cable compensation described in the cable compensation schemes 1 and 2 above, for which measurement of C provides values of $C_{ext}$ in equations 3 and 7, respectively. V(t→∞)=IR may give us the value of R, which can hence be used to program another on-chip function.

Alternatively, the forced response of the RC network may be used to ascertain R and/or C, and the unforced response of the RC network may be used to ascertain the RC time constant, giving the chip a time reference which could be used for many functions including, for example, programming the frequency of an oscillator.

Pairs of values for R and C may be predetermined for desired performance of the chip functions, for example by choosing values of C to provide a desired degree of output voltage compensation $\Delta V_{cable\ comp}$, then choosing values of R for each value of C to provide a suitable decay time constant RC for each level of cable compensation.

However, with regard to the above equation for V(t) that gives the forced response of a parallel RC network, and as described above, by manipulating the equation for V(t) (e.g., by differentiating it with respect to time), quantities may be found which depend only on one component—in this case the rate of change of voltage may depend only on the capacitance, and not at all on the resistor value.

Hence, in the above example, the capacitance may be selected to provide the desired cable compensation (forced) response and the resistor then chosen to create a suitable RC time constant (unforced response). In other examples it may be more appropriate to use another manipulation of the forced response equation (e.g., very long t) to determine the second variable (e.g., R) in isolation from the first (e.g., C).

Figure 5:
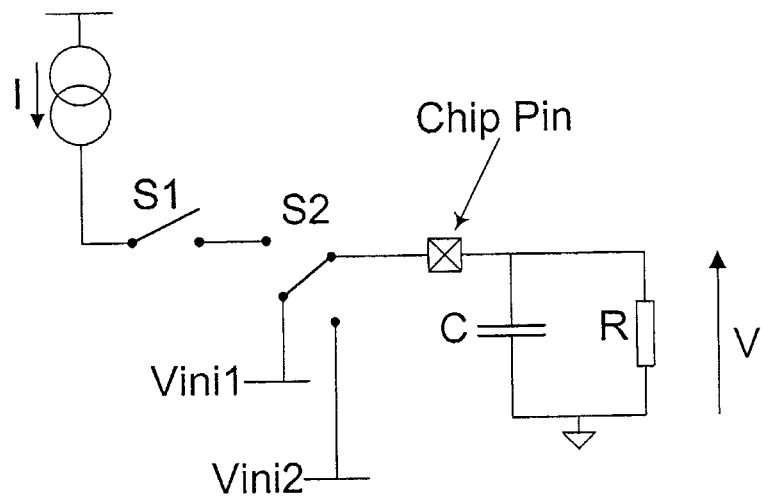
FIG. 5 illustrates (a) a circuit and (b) a circuit response which can be used to determine one forced voltage change and one unforced voltage change at the connection of a resistor and a capacitor to a single chip pin.
Figure 5:
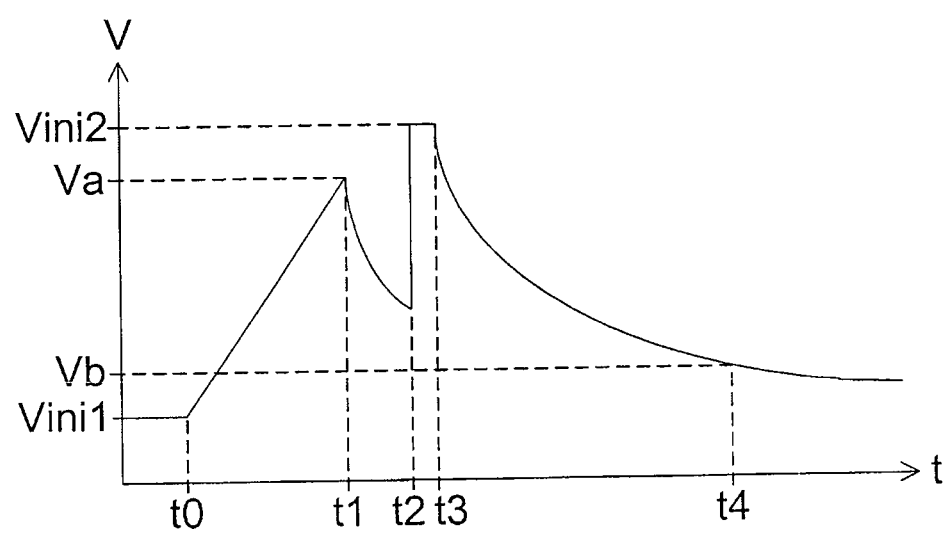
Figure 6:
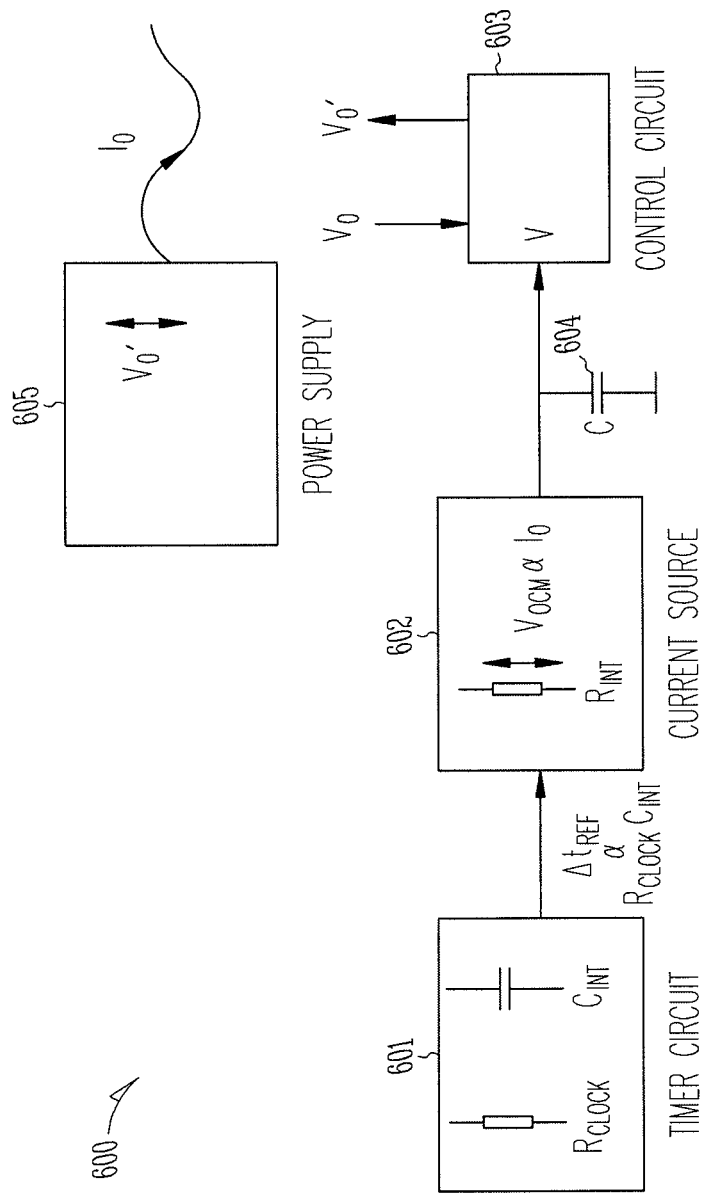
FIG. 6 is a schematic diagram (600) according to various embodiments, including a timer circuit (601), a current source (602), a control circuit (603), a capacitor (604) and a power supply (605).
Figure 7:
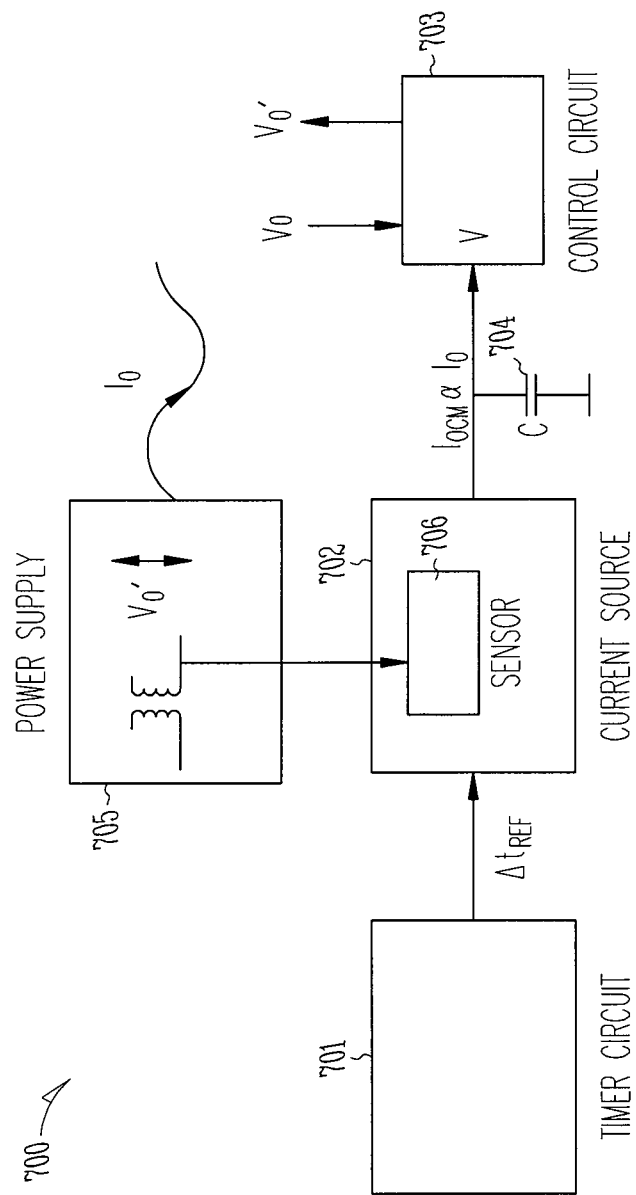
FIG. 7 is a schematic diagram (700) according to various embodiments, including a timer circuit (701), a current source (702) including a sensor (706), a control circuit (703), a capacitor (704) and a power supply (705).

In particular, the response during stimulation may be used for programming one chip function and the response after the stimulation may be used for programming another chip function. For example, a current source may be connected to the terminal to obtain a forced response and then disconnected to obtain the unforced response. This may occur during one cycle of a power converter controller chip, e.g., a flyback or RDFC controller chip. Thus, during one part of a cycle, a known current may be forced through the terminal to obtain a forced response (e.g., a linear ramp), and the voltage of the forced response on the terminal sampled to allow programming of cable compensation. In another part of the cycle, the decay of the unforced response may be sampled to allow programming of an alternative chip function. An example of this technique is illustrated in FIG. 5. The circuit of FIG. 5(a) adds a second switch S2 to the circuit of FIG. 4, allowing one of two reference voltages Vini1 and Vini2, or current source Iref, to be selected for connection to the chip pin. The response of the circuit is shown in FIG. 5(b). The chip pin voltage V is first set to a known value Vini1 by connection via switch S2. At time t0 switches S2 and S1 connect the chip pin to current source I, charging capacitor C such that chip pin voltage V increases linearly with time according to the forced response, i.e dV/dt=I/C, as explained above. At time t1 switch S1 disconnects the chip pin from current source I, at which point the chip pin voltage V=Va. This forced response provides $\Delta Vref=Va-Vini1$, allowing cable compensation to be programmed as explained above. The value of V=Va can be measured using known techniques, for example sample and hold (not shown). As FIG. 5(b) shows, when switch S1 disconnects the chip pin from the current source I at time t1 the voltage V decays according to the unforced response, as capacitor C discharges through resistor R with time constant τ=RC. This unforced response can be measured from time t1 or, as shown in FIG. 5(b), the voltage V can be re-initialised at a convenient time t2 to any desired voltage reference Vini2 using switch S2. At time t3 switch S2 disconnects the chip pin from voltage reference Vini2, leading to a decay in voltage V to V=Vb, measured at time t4. The voltage difference $\Delta Vdecay=Vini2-Vb$ can be used to program a second function, according to methods well known in the art.

Thus, in any embodiment of cable compensation such as described in relation to schemes 1 and 2, an RC network connected to a single chip pin may be used to program both the cable compensation and independently program another separate on-chip function, by providing either a reference resistance or a reference time constant.

While specific embodiments have been described above, many other effective alternatives will no doubt occur to the skilled person. It will be understood that the invention is not limited to the described embodiments and encompasses modifications apparent to those skilled in the art lying within the spirit and scope of the claims appended hereto.

The invention claimed is:

1. Cable compensation apparatus for compensating voltage drop of a cable connected between an electrical power supply and an electrical device, comprising:
    a first capacitor;
    a timer circuit to time a predetermined time period;
    a current source to supply to said first capacitor a first current proportional to an output current outputted by the power supply to the cable, the current source to determine duration of said supply on the basis of said timing by said timer circuit such that said duration is equal to said predetermined time period;
    voltage change determination circuitry to determine a voltage change on said first capacitor due to charging of said first capacitor by said first current; and
    a control circuit to adjust an output voltage outputted by said power supply to said cable dependent on said determined voltage change on said first capacitor.

2. The cable compensation apparatus of claim 1, wherein:
    said cable compensation apparatus comprises a chip;
    said timer circuit comprises a first resistor and a second capacitor, arranged such that said predetermined time period is proportional to the product of the resistance of said first resistor and the capacitance of said second capacitor;
    said current source comprises a second resistor and is arranged to generate said first current by applying to said second resistor a voltage proportional to said output current, wherein
    said first resistor and said second resistor are integral to said chip.

3. The cable compensation apparatus of claim 1 for programmable cable compensation, wherein said first capacitor is a discrete component.

4. The cable compensation apparatus of claim 1, wherein:
    said current source comprises a sensor arranged to sense said output current by sensing a signal on either the primary side or the secondary side of a power supply that comprises a transformer having a primary side and a secondary side.

5. Cable compensation apparatus for compensating voltage drop of a cable connected between an electrical power supply and an electrical device, comprising:
    a first capacitor;
    a second capacitor;
    a reference current generator to charge said second capacitor;
    a timer circuit to determine a first time period dependent on a voltage on said second capacitor;
    a current source to supply to said first capacitor a first current proportional to an output current outputted by the power supply to the cable, the current source to determine duration of said supply on the basis of said determining by said timer circuit, such that said duration is equal to said first time period;
    voltage change determination circuitry to determine a voltage change on said first capacitor due to charging of said first capacitor by said first current;
    a control circuit to adjust an output voltage outputted by said power supply to said cable dependent on said determined voltage change on said first capacitor.

6. The cable compensation apparatus of claim 5 for programmable cable compensation, wherein said second capacitor is a discrete component.

7. The cable compensation apparatus of claim 5, wherein:
    said current source comprises a sensor arranged to sense said output current by sensing a signal on either on the primary side or the secondary side of a power supply that comprises a transformer having a primary side and a secondary side.

8. The cable compensation apparatus of claim 3, comprising:
    a device comprising said control circuit;
    said first capacitor connected to an external terminal of said device;
    a discrete resistor external to said device and connected to said terminal;
    stimulator circuitry to apply to said terminal a predetermined time-varying electrical signal having a first signal part and a second signal part, said first and second signal parts separate in time, to obtain a first signal response of said terminal to said first signal part and a second signal response of said terminal to said second signal part; and
    said device arranged to program at least two device functions on the basis of said first signal response and said second signal response, wherein
    at least one of said device functions is cable compensation.

9. The cable compensation apparatus of claim 6, comprising:
    a device comprising said control circuit;
    said second capacitor connected to an external terminal of said device;
    a discrete resistor external to said device and connected to said terminal; and
    stimulator circuitry to apply to said terminal a predetermined time-varying electrical signal having a first signal part and a second signal part, said first and second signal parts separate in time, to obtain a first signal response of said terminal to said first signal part and a second signal response of said terminal to said second signal part; and
    said device arranged to program at least two device functions on the basis of said first signal response and said second signal response, wherein
    at least one of said device functions is cable compensation.

10. Method of compensating voltage drop of a cable connected between an electrical power supply and an electrical device, comprising:
    timing a predetermined time period;
    generating a first current proportional to an output current outputted by said power supply to said cable;
    charging a first capacitor using the first current during said predetermined time period, wherein duration of said charging is determined on the basis of said timing, such that said duration is equal to said predetermined time period;
    determining a voltage change on said first capacitor due to said charging of said first capacitor by said first current;
    adjusting an output voltage outputted by said power supply to said cable dependent on said determined voltage change on said first capacitor.

11. Method of claim 10 for programming said compensating, further comprising:

determining said first capacitor dependent on a predetermined desired sensitivity of the output voltage adjustment to changes in the output current, wherein
said first capacitor is a discrete component.

12. Method of claim 10, further comprising:
determining said predetermined time period to be proportional to the product of the resistance of a first resistor and the capacitance of a second capacitor, wherein:
said generating is performed by applying to a second resistor a voltage that is proportional to said output current; and
said first resistor and said second resistor are integral to a single chip.

13. Method of compensating voltage drop of a cable connected between an electrical power supply and an electrical device, comprising:
generating a predetermined reference current;
charging a first capacitor using said predetermined reference current;
determining a first time period on the basis of a voltage on said first capacitor;
generating a first current that is proportional to an output current outputted by said power supply to said cable;
charging a second capacitor using said first current during a second time period dependent on said determined first time period, wherein duration of said charging is determined on the basis of said determining of said first time period, such that said duration is equal to said first time period;
determining a voltage change on said first capacitor due to said charging of said second capacitor by said first current;
adjusting an output voltage outputted by said power supply to said cable dependent on said determined voltage change on said second capacitor.

14. Method of claim 13 for programming said compensating, further comprising:
determining said first capacitor dependent on a predetermined desired sensitivity of the output voltage adjustment to changes in the output current, wherein
said first capacitor is a discrete component.

15. Method of claim 10, further comprising:
stimulating a circuit comprising a discrete resistor and a discrete capacitor with a time-varying electrical signal, said discrete resistor and discrete capacitor being connected to an external terminal of a device;
obtaining a forced response and an unforced response on said terminal;
programming at least two chip functions on the basis of said responses, one of said chip functions being cable compensation.

16. Method of claim 13, further comprising:
stimulating a circuit comprising a discrete resistor and a discrete capacitor with a time-varying electrical signal, said discrete resistor and discrete capacitor being connected to an external terminal of a device;
obtaining a forced response and an unforced response on said terminal;
programming at least two functions of said device on the basis of said responses, one of said chip functions being cable compensation.

17. Method of claim 15, wherein another of said functions is a time delay, an oscillator frequency setting or reference current generation.

18. Method of claim 16, wherein another of said functions is a time delay, an oscillator frequency setting or reference current generation.

19. Method of claim 17, wherein said discrete capacitor and said discrete resistor are connected in parallel.

20. Method of claim 18, wherein said discrete capacitor and said discrete resistor are connected in parallel.

* * * * *